United States Patent
Na et al.

(10) Patent No.: US 6,795,844 B1
(45) Date of Patent: Sep. 21, 2004

(54) APPARATUS FOR CONTROLLING OPTIONAL FUNCTIONS OF ELECTRONIC EQUIPMENT AND METHOD THEREFOR

(75) Inventors: Jae-hoon Na, Suwon (KR); Gyu-ho Lee, Suwon (JP)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/352,774

(22) Filed: Jul. 14, 1999

(30) Foreign Application Priority Data

Jul. 14, 1998 (KR) ............................................ 98-28418

(51) Int. Cl.⁷ .............................. G06F 9/00; G06F 3/00
(52) U.S. Cl. ....................... 709/100; 709/102; 709/104; 710/1; 710/2; 710/8; 710/10; 710/14
(58) Field of Search ................................. 709/100–102, 709/104; 710/2, 5, 6, 8, 9

(56) References Cited

U.S. PATENT DOCUMENTS

| | | | |
|---|---|---|---|
| 5,115,410 A | 5/1992 | Hirata et al. ................. 395/650 |
| 5,539,661 A | 7/1996 | Nordenstam ............. 364/514 R |
| 5,577,257 A | * 11/1996 | Nakamura ..................... 710/12 |
| 5,664,190 A | * 9/1997 | Cohen et al. ................ 709/100 |
| 6,115,144 A | * 9/2000 | Hirokawa .................... 358/468 |

* cited by examiner

Primary Examiner—Majid A. Banankhah
Assistant Examiner—Syed Ali
(74) Attorney, Agent, or Firm—Sughrue Mion, PLLC

(57) ABSTRACT

An apparatus for processing options of electronic equipment models and a method therefor, and more particularly, an apparatus for controlling optional functions of electronic equipment models, in which various functions are executed by the same hardware circuit structure for each model, and a method therefor are provided.

According to the present invention, it is possible to improve productivity by using one standardized hardware circuit, thus selectively realizing various optional functions and to singularizing the number of the PCBs needed to perform the optional functions, thus preventing a specification accident in which the optional function is changed by mistake during production.

12 Claims, 6 Drawing Sheets

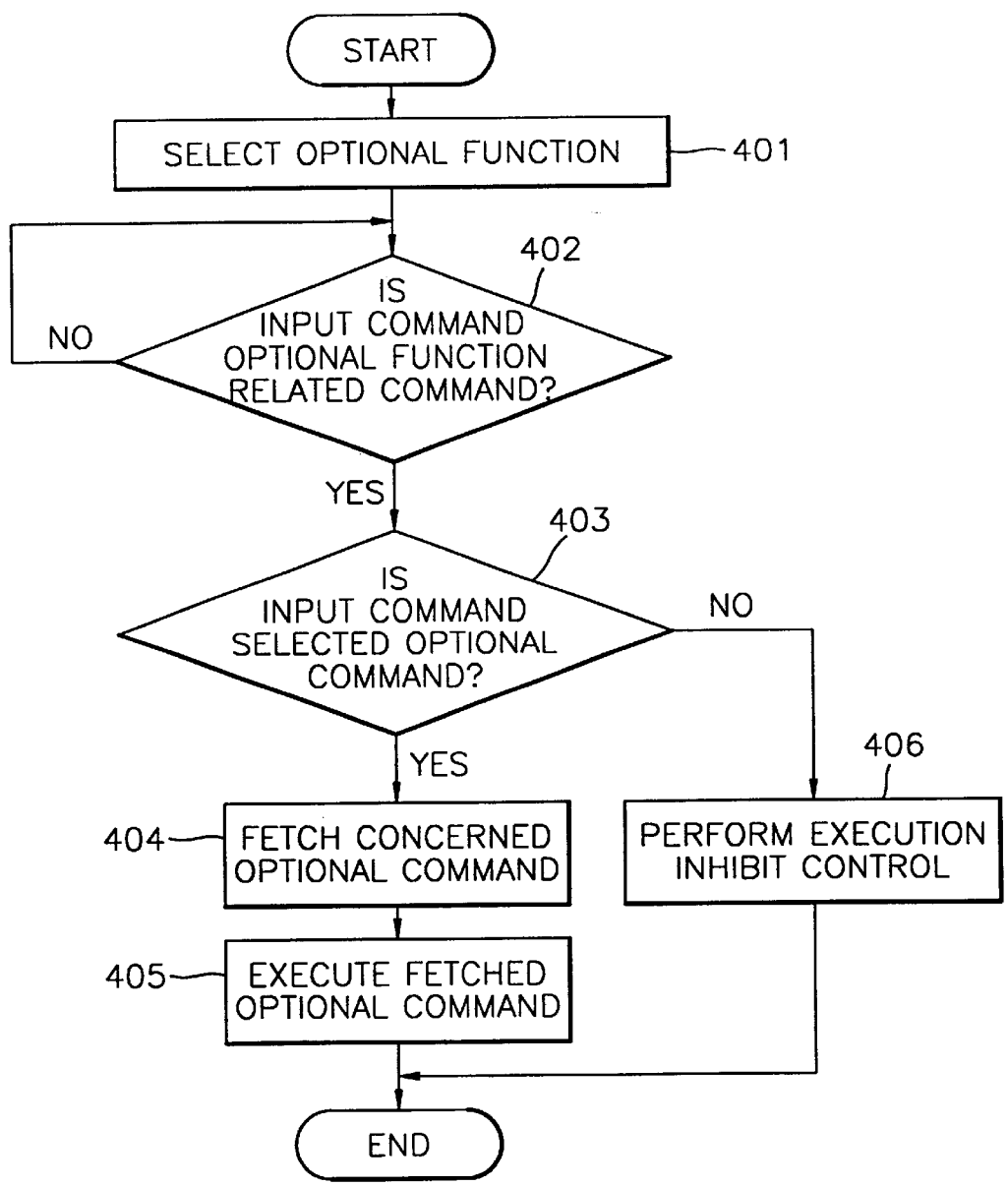

APPARATUS FOR CONTROLLING OPTIONAL FUNCTIONS OF ELECTRONIC EQUIPMENT AND METHOD THEREFOR

BACKGROUND OF THE INVENTION

1. Field of the Invention

The present invention relates to an apparatus for processing optional programs in electronic equipment and a method therefor, and more particularly, to an apparatus for controlling optional functions in electronic equipment, in which various functions are executed using a single hardware circuit, and a method therefor.

2. Description of the Related Art

Function printed circuit boards (PCB) are typically used in electronic equipment such that based on the presence or absence of optional diodes in a key metric, one or more optional functions can be selected from a group of optional functions. That is, optional functions corresponding to the specifications of a particular product model can be selected according to the combination of diodes in a key metric connected between the scan out port and the scan in port of a microprocessor.

Therefore, since the design of the key metrics of the scan in and scan out ports of the microprocessor varies in each specification, the function PCB of a front panel is designed so that different key metric designs are applied according to the optional functions of produced models.

Since the PCB is managed according to models having different optional functions when the products are produced, the number of PCBs increases. Accordingly, it is difficult to manage materials for production. Also, when a changed PCB is applied according to the change of the specification, the PCB mis-operates in a selected model.

SUMMARY OF THE INVENTION

To solve the above problem, it is an object of the present invention to provide an apparatus for controlling optional functions of electronic equipment, designed to have the same hardware of a microprocessor, regardless of the optional functions of products.

It is another object of the present invention to provide a method for controlling optional functions of electronic equipment.

Accordingly, to achieve the first object, there is provided an apparatus for controlling optional programs corresponding to the mode type of electronic equipment, including a data base for storing all optional programs, comprising a memory for storing a selected optional program in a specific region, a controller for generating a control command for selecting the optional program, a central processing unit (CPU) for decoding the control command, controlling the display of an optional function selecting menu screen with respect to a selected level, reading the optional program selected according to an input selection command, storing the selected optional program in the memory, and executing only the optional program stored in the specific region of the memory according to an input optional program execution command, and a displayer for displaying the optional program selecting menu screen.

To achieve the second object, there is provided a method for controlling optional functions of electronic equipment, by which the same hardware circuit structure is used regardless of different optional functions, comprising the steps of (a) selecting the program of an optional function corresponding to the product specification of the electronic equipment and storing the program in a memory, (b) determining whether a command input to the CPU of the electronic equipment corresponds to an optional function related command, (c) determining whether the command input to the CPU corresponds to an optional program execution command stored in the step (a) after determining in step (b) that the command input to the CPU corresponds to the optional function related command, and (d) fetching and executing the optional program when the inputted command is the optional program execution command stored in the step (a) as determined in step (c) and preventing the execution of a concerned command when the input command is not the optional program execution command stored in step (a).

BRIEF DESCRIPTION OF THE DRAWINGS

The above objects and advantages of the present invention will become more apparent by describing in detail a preferred embodiment thereof with reference to the attached drawings in which:

FIG. 4 is a flowchart of a method for controlling the optional functions of the electronic equipment according to the present invention.

DESCRIPTION OF THE PREFERRED EMBODIMENTS

Figure 1:
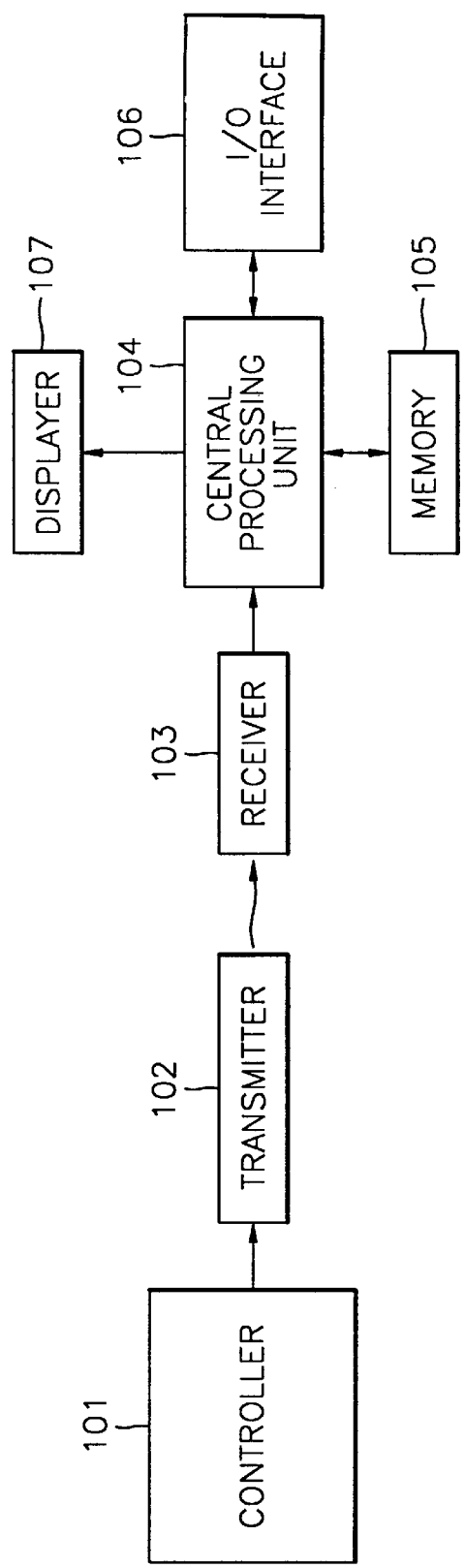
FIG. 1 shows the structure of an apparatus for controlling optional functions of electronic equipment according to the present invention.

As shown in FIG. 1, an apparatus for controlling optional functions of electronic equipment according to the present invention includes a controller 101, a transmitter 102, a receiver 103, a central processing unit (CPU) 104, a memory 105, an input/output (I/O) interface 106, and a displayer 107.

The controller 101 is loaded with a data base for storing all programs related to options. The controller 101 generates a menu display request for displaying a menu of selectable optional functions when an option selection command is inputted during the production of a product and transmits a selected optional program.

Figure 2A:
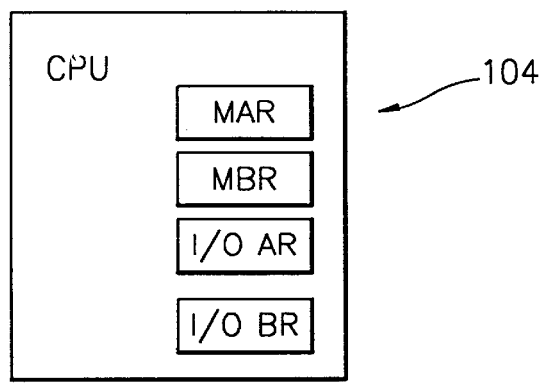
FIGS. 2A and 2B show the structures of the CPU and the memory shown in FIG. 1.

As shown in FIG. 2A, the CPU 104 performs data processing by a command decoder and a general purpose arithmetic logic module which are internal main elements. The CPU 104 includes a memory address register (MAR) for storing addresses in the memory 105 and performing reading or writing operation, a memory buffer register (MBR) for temporarily storing data to be stored in the memory 105 or data read from the memory 105, an input/output address register (I/O AR), and an input/output buffer register (I/O BR) for exchanging data with an input and output apparatus.

Figure 2B:
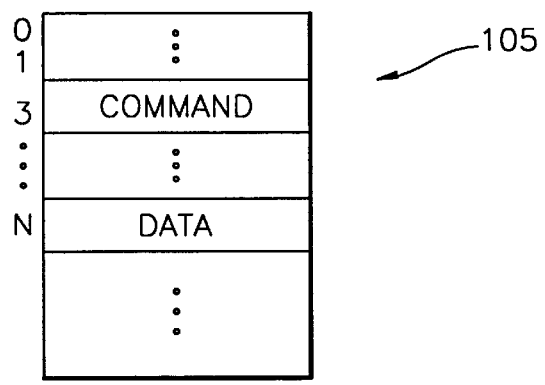

As shown in FIG. 2B, in the memory 105, commands or data related to optional functions are stored in sequentially designated addresses.

A program related to an optional function which is selected through the option selecting menu screen is stored in a specific region of memory 105. The memory 105 is a non-volatile memory in which stored data is not erased when power is turned off.

The control operation of FIG. 1 will be described as follows on the basis of the flowchart of FIG. 4.

In step 401, a user selects optional functions through the optional program selecting menu.

In a method of selecting an optional function, when a specific function key for displaying the optional function selecting menu is input, the controller 101 generates a menu display request for displaying a menu of selectable optional functions. Then, the transmitter 102 transmits program data corresponding to the menu display request for displaying a menu of selectable optional functions, to the receiver 103. The receiver 103 outputs the received program data to the CPU 104. Then, the CPU 104 decodes the received program and displays a main option selecting menu screen shown in FIG. 5A or 5B through the displayer 107.

Using a cursor key, a user selects a country to which a concerned model is to be sold among the displayed main option menus and inputs a setting key (the key ▶), and an optional program corresponding to the selected country is stored in the memory 105. Then, a sub-menu screen for selecting a model name is displayed as shown in FIG. 5C. The user selects and sets a model, and a model related optional program corresponding to the selected model is stored in the memory 105.

Figure 5A:
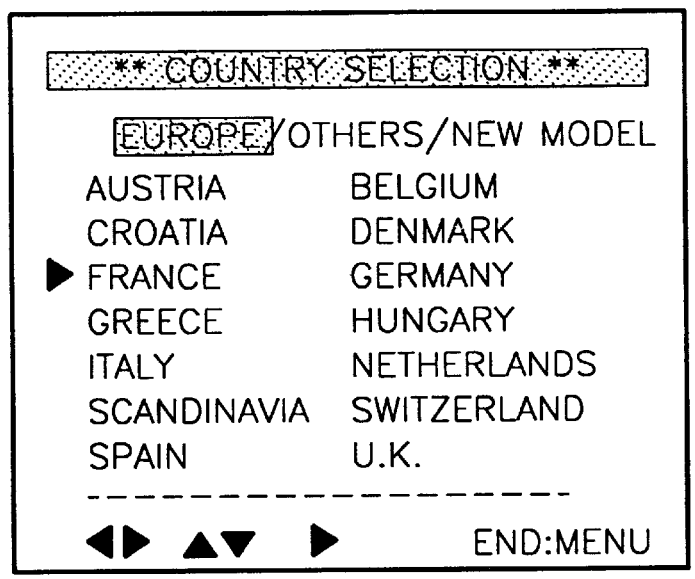
FIGS. 5A through 5E show optional function selecting menu screens displayed in the step of setting optional functions of FIG. 4.
Figure 5B:
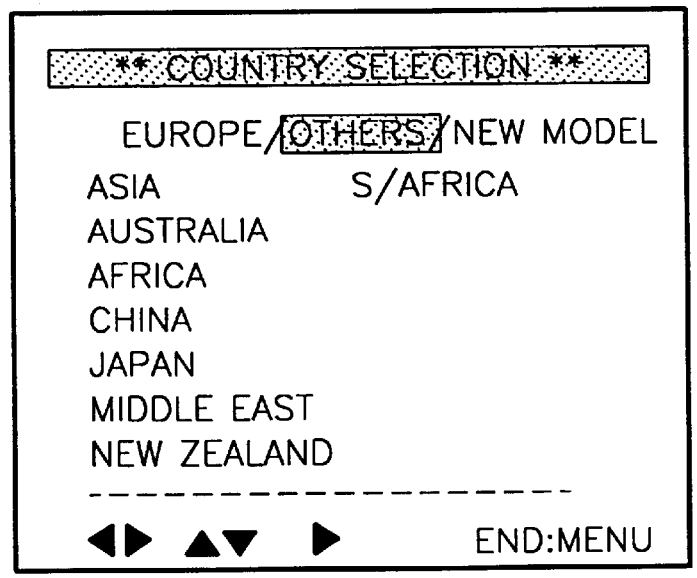
Figure 5C:
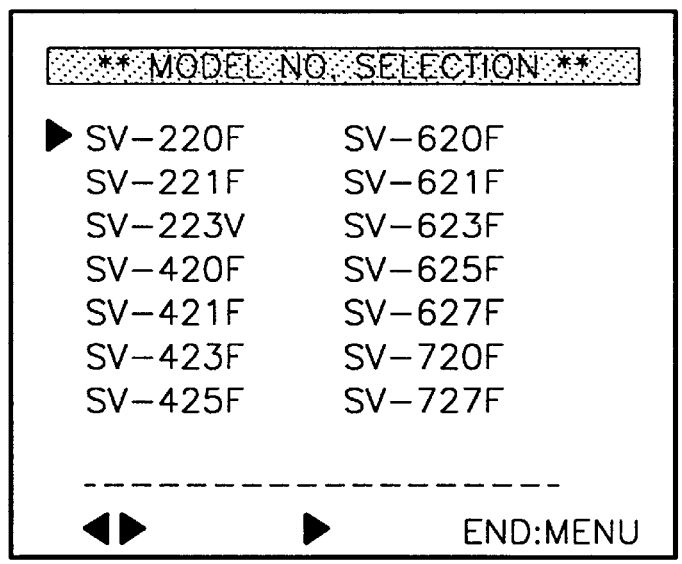
Figure 5D:
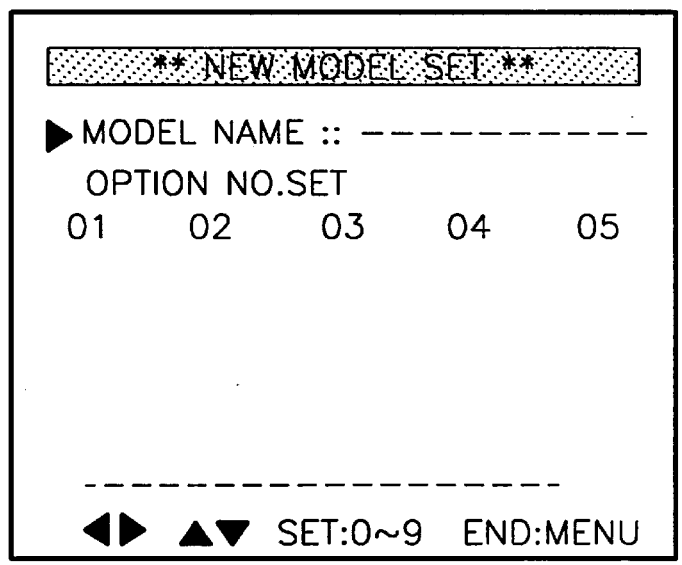
Figure 5E:
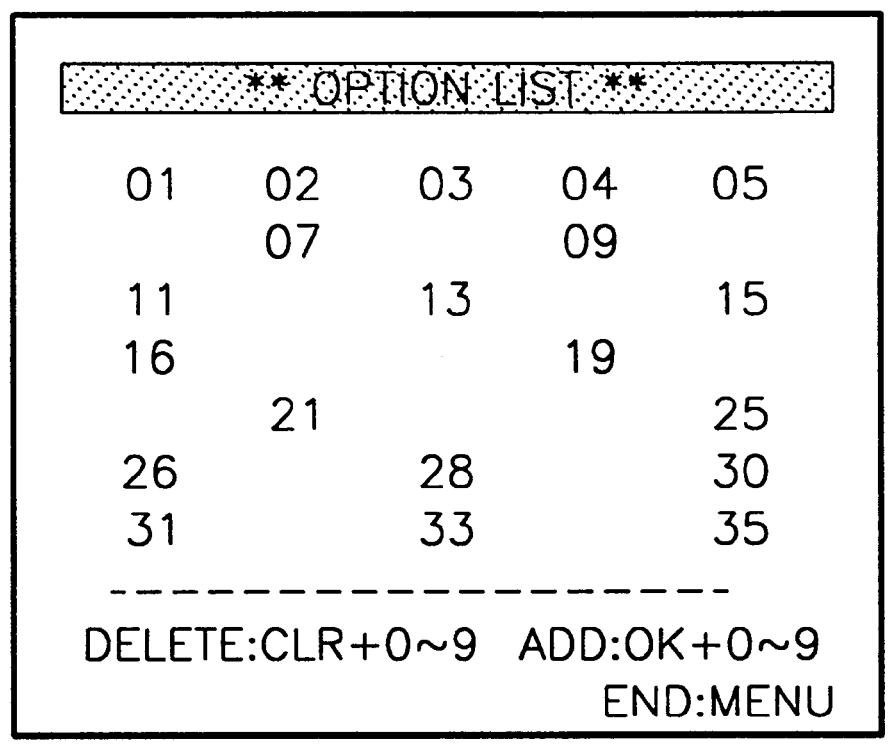

Then, a menu screen of the lowest level for selecting an optional function is displayed as shown in FIG. 5E. In the menu screen, the user selects an optional function related to the optional programs of the concerned model. The selected programs related to the selected optional function are outputted from the controller 101 and are stored in the designated optional program region of the memory 105.

When a model, except for the model initially set in the memory 105 is to be designed, the user should select the item "NEW MODEL" from the menu screen of FIG. 5A or 5B. When the item "NEW MODEL" is selected, the user adds a new model name via the menu screen which is displayed as shown in FIG. 5D. When the user selects a program number related to the optional function of the added model, the optional program corresponding to the program number is outputted from the controller 101. The selected optional program is stored in the memory 105 through the receiver 103.

Through the above processes, it is possible to select and set different optional functions according to concerned models during the production of products.

After selecting and setting the optional functions, when the user desires to modify some of the optional functions, the menu screen of FIG. 5E is displayed. Then, in order to delete some optional functions, CTL+0 through 9 (concerned optional program numbers) are input as an example of a program. In order to add some optional functions, OK+0 through 9 (concerned optional program numbers) are input.

In step 402, it is determined whether the command input through the I/O interface 106 is related to the optional functions.

In step 403, when the input command is the optional function related command as a determination result of the step 402, it is determined whether the input command is the optional function related command selected in the step 401 and stored in the optional program region of the memory 105.

In step 404, when the input command is the optional function related command stored in the optional program region of the memory 105 as a determination result of the step 403, the concerned optional program is fetched in order to execute the concerned optional function stored in the memory 105.

In step 405, a command with respect to the program fetched in the step 404 is decoded and executed.

Figure 3:
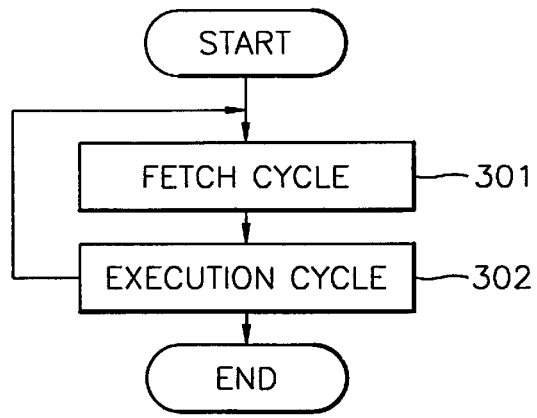
FIG. 3 shows a cycle of the CPU shown in FIG. 1 of fetching and executing commands.

In steps 405 and 404, as shown in FIG. 3, a fetch cycle 301 for reading a command and an execution cycle 302 for decoding and executing the fetched command are repeated.

In the step 406, when the input command is not the optional function related command stored in the option related program region of the memory 105 as the determination result of the step 403, an execution inhibit control for inhibiting the program corresponding to the concerned command is performed.

In an embodiment of the present invention, the data base for storing all the optional programs is loaded into the controller 101. However, the data base can be loaded into the CPU 104. When the optional program data base is loaded into the controller 101, the optional program is directly stored in the memory 105 from the data base of the CPU 104 when the optional program is selected. In this case, the controller 101 controls only the optional program selecting menu screen.

Since it is possible to realize various optional functions by using the same CPU 104 and hardware circuit it is possible to standardize the PCB in the above-mentioned way; in spite of the difference between the optional functions of product models thus productivity is improved.

As mentioned above, according to the present invention, it is possible to improve productivity by using one standardized hardware circuit, to selectively realize various optional functions and to singularize the number of the PCBs needed to perform the optional functions, as a result specification accidents in which the optional function is changed by mistake during production is prevented from happening.

What is claimed is:

1. An apparatus for controlling optional programs of electronic equipment according to a product specification selected from a plurality of product specifications, comprising:

a memory for storing a selected optional program in a specific region of said memory;

a controller for generating a control command for selecting an optional program corresponding to the selected product specification;

a central processing unit (CPU) for decoding the control command, controlling the display of an optional function selecting menu screen with respect to a selected level, reading said optional program selected according to an input selection command, storing said selected optional program in said memory, and executing only said optional program stored in said specific region of said memory, according to an input optional program execution command; and a displayer for displaying said optional program selecting menu screen.

2. The apparatus of claim 1, wherein said memory is a non-volatile memory.

3. The apparatus of claim 1, wherein said apparatus contains a data base for storing all optional programs.

4. The apparatus of claim 1, wherein said electronic equipment contains a single hardware circuit structure to implement all optional functions.

5. An electronic equipment controlling method for selecting optional functions in electronic equipment, said electronic equipment including a single hardware circuit structure for implementing the different optional functions, comprising the steps of:

(a) selecting a product specification of said electronic equipment from a plurality of product specifications;

(b) selecting a program of an optional function corresponding to the selected product specification of said electronic equipment and storing said program in a memory;

(c) determining whether a command inputted to the CPU of said electronic equipment corresponds to an optional function related command;

(d) if said inputted command to said CPU is determined to correspond to said optional function related command in said step (c), determining whether said command inputted to the CPU corresponds to an optional program execution command stored in said memory of step (b); and (e) fetching and executing said optional program when said inputted command is said optional program execution command stored in said memory of step (b) as determined in step (d) and preventing said execution of said command when said inputted command is not said optional program execution command stored in said memory of step (b).

6. The method of claim 5, wherein said step (b) further comprises the steps of:

(a') determining whether an option setting command for setting said optional function is received;

(b') if it is determined that said option setting command is received in said step (a'), sequentially displaying optional function selecting menu screens from the highest option menu; and (c') storing a program corresponding to said optional function selected by a user from said optional function selecting menu screen into said memory.

7. An electronic equipment controlling method for selecting optional functions in electronic equipment, comprising the steps of:

(a) selecting a particular model of said electronic equipment from a plurality of models, each model including the same single hardware circuit structure for implementing the different optional functions;

(b) determining whether an optional function selecting command for setting the optional program of said electronic equipment is inputted;

(c) if it is determined that said optional function selecting command is inputted in said step (b), displaying an optional program selecting menu screen of the highest level for setting an optional program;

(d) selecting items corresponding to the selected particular model of said electronic equipment from said optional program selecting menu screen; and (e) storing said optional program corresponding to said selected items whenever an item is selected in said step (d) and sequentially displaying optional program selecting menu screens of lower levels.

8. The method of claim 7, wherein said optional program selecting menu screens are classified by countries and models according to different optional programs.

9. The method of claim 8, wherein said optional program selecting menu screens are designed so that a country is selected from said menu screen of the highest level, a model applied to said country is thereafter selected from said menu screen of a lower level, and said optional programs corresponding to said optional functions of said model are added to or deleted from an optional program selecting menu screen of a lowest level.

10. An apparatus for controlling optional programs of electronic equipment according to a product specification selected from a plurality of product specifications, comprising:

a controller, having an output for transmitting a generated control command to a central processing unit (CPU) via a transmitter and receiver, representing the selection of an optional program corresponding to the selected product specification;

a memory, having an input for receiving said selected optional program from said CPU and storing said selected optional program in a specific region of said memory;

a central processing unit (CPU) having a decoder for decoding said control command, an output for sending a selected level of an optional function selecting menu screen to a display, a memory address register for reading said selected optional program according to an input selection command, a memory buffer register for storing said selected optional program to be stored in said memory, and executing only said optional program stored in said specific region of said memory, according to an input optional program execution command; and a displayer for displaying said optional program selecting menu screen.

11. The apparatus of claim 10, wherein said apparatus contains a data base for storing all optional programs.

12. The apparatus of claim 10, wherein said electronic equipment contains a single hardware circuit structure to implement all optional functions.

* * * * *